US011477052B2

(12) United States Patent
Östman (10) Patent No.: US 11,477,052 B2
(45) Date of Patent: Oct. 18, 2022

(54) OFDM CHANNEL ESTIMATION (71) Applicant: Nordic Semiconductor ASA, Trondheim (NO)

(72) Inventor: Kjell Östman, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 23 days.

(21) Appl. No.: 17/255,398

(22) PCT Filed: Jun. 26, 2019

(86) PCT No.: PCT/EP2019/067089
§ 371 (c)(1),
(2) Date: Dec. 22, 2020

(87) PCT Pub. No.: WO2020/002480
PCT Pub. Date: Jan. 2, 2020

(65) Prior Publication Data
US 2021/0297287 A1    Sep. 23, 2021

(30) Foreign Application Priority Data
Jun. 27, 2018  (GB) .................................. 1810547

(51) Int. Cl.
*H04L 25/02* (2006.01)
*H04L 5/00* (2006.01)

(52) U.S. Cl.
CPC ........ *H04L 25/022* (2013.01); *H04L 25/0228* (2013.01); *H04L 5/001* (2013.01)

(58) Field of Classification Search
CPC .... H04L 25/022; H04L 25/0228; H04L 5/001
See application file for complete search history.

(56) References Cited

U.S. PATENT DOCUMENTS

| 7,042,963 | B1 * | 5/2006 | Raith | .................... | H04L 1/0046 |
|   |   |   |   |   | 375/341 |
| 10,333,683 | B2 * | 6/2019 | Palenius | ............... | H04L 5/0073 |

(Continued)

FOREIGN PATENT DOCUMENTS

| CN | 105721361 A | 6/2016 |   |   |
| CN | 111937452 A * | 11/2020 | ........... | H04L 5/0032 |

(Continued)

OTHER PUBLICATIONS

IPO Search Report under Section 17(5) for GB 1810547.8, dated Dec. 27, 2018, 5 pages.

(Continued)

*Primary Examiner* — Berhanu Tadese
(74) *Attorney, Agent, or Firm* — Klarquist Sparkman, LLP (57) ABSTRACT A radio receiver of a radio communication system is configured to tune to a radio channel by generating a periodic signal, mixing the periodic signal with radio signals received from a radio transmission system and passing the mixed signal through a channel filter. The radio receiver receives, from the radio transmission system, an OFDM data signal modulated on a set of OFDM subcarriers within the tuned channel. The channel filter has a passband that is wider than the channel bandwidth of the tuned channel such that the filter passes i) said OFDM data signal, ii) an in-channel reference signal, and iii) an out-of-channel reference signal. The radio receiver comprises channel estimation logic configured to use both reference signals to calculate a channel estimate for an OFDM subcarrier within the tuned channel.

11 Claims, 10 Drawing Sheets

(56) References Cited

U.S. PATENT DOCUMENTS

| | | | | |
|---|---|---|---|---|
| 10,856,310 | B2* | 12/2020 | Rico Alvarino | H04W 72/1263 |
| 10,972,315 | B2* | 4/2021 | Nissilä | H04L 25/0228 |
| 2004/0161233 | A1* | 8/2004 | Zalevsky | H04L 1/20 398/26 |
| 2009/0323791 | A1* | 12/2009 | Yee | H04L 25/0226 375/230 |
| 2011/0228868 | A1 | 9/2011 | Hua et al. | |
| 2012/0236802 | A1 | 9/2012 | Gong | |
| 2017/0359820 | A1* | 12/2017 | Gaal | H04W 72/0446 |
| 2018/0014251 | A1* | 1/2018 | Sambhwani | H04W 52/0212 |
| 2018/0091345 | A1* | 3/2018 | Lee | H04L 5/001 |
| 2018/0097596 | A1* | 4/2018 | Palanivelu | H04L 5/0053 |
| 2018/0234169 | A1* | 8/2018 | Sridharan | H04B 7/2606 |
| 2018/0234229 | A1* | 8/2018 | Somichetty | H04L 5/0053 |
| 2018/0248671 | A1* | 8/2018 | Bhattad | H04L 1/08 |
| 2018/0278442 | A1* | 9/2018 | Rogers | H04B 1/1027 |
| 2019/0097776 | A1* | 3/2019 | Kim | H04L 5/00 |
| 2019/0190669 | A1* | 6/2019 | Park | H04W 56/001 |
| 2019/0215121 | A1* | 7/2019 | Lin | H01M 10/0585 |
| 2019/0239170 | A1* | 8/2019 | Thangarasa | H04W 16/18 |
| 2019/0261308 | A1* | 8/2019 | Modarres Razavi | G01S 5/10 |
| 2019/0353746 | A1* | 11/2019 | Razavi | G01S 5/0231 |
| 2020/0008198 | A1* | 1/2020 | Urabayashi | H04W 4/70 |
| 2020/0015279 | A1* | 1/2020 | Fujishiro | H04W 74/0833 |
| 2020/0015280 | A1* | 1/2020 | Fujishiro | H04W 4/027 |
| 2020/0045667 | A1* | 2/2020 | Modarres Razavi | H04W 64/003 |
| 2020/0091608 | A1* | 3/2020 | Alpman | H01Q 25/001 |
| 2020/0091944 | A1* | 3/2020 | Sundström | H04L 5/0044 |
| 2020/0169367 | A1* | 5/2020 | Palanivelu | H04W 64/00 |
| 2020/0186321 | A1* | 6/2020 | Hwang | H04L 5/14 |
| 2020/0228269 | A1* | 7/2020 | Zhang | H04W 76/27 |
| 2020/0236644 | A1* | 7/2020 | Gunnarsson | H04W 64/00 |
| 2020/0245317 | A1* | 7/2020 | Hwang | H04W 72/048 |
| 2020/0313860 | A1* | 10/2020 | Junttila | H04L 9/0643 |
| 2020/0322891 | A1* | 10/2020 | Östman | G01S 19/36 |
| 2020/0336339 | A1* | 10/2020 | Nissilä | H04L 25/0228 |
| 2020/0351727 | A1* | 11/2020 | Fujishiro | H04W 36/0079 |
| 2020/0374840 | A1* | 11/2020 | Takeda | H04W 56/0015 |
| 2021/0007127 | A1* | 1/2021 | Hwang | H04L 5/0055 |
| 2021/0045123 | A1* | 2/2021 | Yavuz | H04L 5/0048 |
| 2021/0105090 | A1* | 4/2021 | Park | H04B 7/0404 |
| 2021/0232381 | A1* | 7/2021 | Winblad | G06F 16/2379 |
| 2021/0234738 | A1* | 7/2021 | Ryan | H04L 27/2671 |
| 2021/0240870 | A1* | 8/2021 | Au | G06F 21/602 |
| 2021/0266197 | A1* | 8/2021 | Östman | H04L 5/0007 |
| 2021/0297287 | A1* | 9/2021 | Östman | H04L 25/0228 |

FOREIGN PATENT DOCUMENTS

| | | | | |
|---|---|---|---|---|
| EP | 3622746 A4 * | 7/2020 | | H04L 5/005 |
| GB | 2 446 439 A | 8/2008 | | |
| WO | WO-2017082797 A1 * | 5/2017 | | H04L 25/03834 |
| WO | WO-2018175724 A1 * | 9/2018 | | H04L 5/0007 |
| WO | WO-2018222301 A * | 12/2018 | | H04L 5/0048 |
| WO | WO-2018222301 A1 * | 12/2018 | | H04L 5/0048 |
| WO | WO 2020/002476 A1 | 1/2020 | | |
| WO | WO 2020/002480 A1 | 1/2020 | | |
| WO | WO-2020002476 A1 * | 1/2020 | | H04L 25/0204 |
| WO | WO-2020002480 A1 * | 1/2020 | | H04L 25/022 |

OTHER PUBLICATIONS

International Search Report and Written Opinion for PCT/EP2019/067089, dated Aug. 29, 2019, 16 pages.

Intel Corporation: "Frequency domain CRS muting for efeMTC", 3GPP TSG RAN WG1 Meeting #88bix, R1-1704695, Apr. 2017, 4 pages.

Sony: "Frequency Domain CRS Muting for efeMTC", 3GPP TSG RAN WG1 Meeting #88bix, R1-1705206, Apr. 2017, 4 pages.

Math Works, "Channel Estimation," https://www.mathworks.com/help/lte/ug/channel-estimation.html?s_tid=gn_loc_drop, downloaded Oct. 11, 2017, 8 pages.

IPO Search Report under Section 17(5) for GB1810548.6, dated Dec. 27, 2018, 3 pages.

International Search Report and Written Opinion for PCT/EP2019/067084, dated Aug. 29, 2019, 16 pages.

* cited by examiner

OFDM CHANNEL ESTIMATION

CROSS REFERENCE TO RELATED APPLICATIONS

This is the U.S. National Stage of International Application No. PCT/EP2019/067089, filed Jun. 26, 2019, which was published in English under PCT Article 21(2), which in turn claims the benefit of Great Britain Application No. 1810547.8, filed Jun. 27, 2018.

BACKGROUND OF THE INVENTION

This invention relates to channel estimation in Orthogonal Frequency Division Multiplexing (OFDM) radio receivers.

OFDM is a form of radio transmission that is used in various radio protocols such as Long Term Evolution (LTE™), various IEEE™ 802.11 standards, DAB™ radio, DVB-T, and WiMAX™. Rather than encoding data on a single carrier frequency, a data stream is spread over some or all of a radio channel containing multiple OFDM subcarriers. The OFDM subcarriers are typically closely spaced, at regular intervals, across the frequency spectrum, although this is not essential. The subcarriers are orthogonal to avoid mutual interference. OFDM can thereby provide good resilience to multipath fading and to external interference.

It is known for an OFDM radio transmitter, such as a cellular network base station (BS), to transmit predetermined reference signals at predefined time slots and on predetermined subcarrier frequencies. These reference signals, time slots and subcarriers are known in advance by associated radio receivers, such as user equipment (UE) on the network. In an LTE downlink, these reference signals are predetermined QPSK di-bits referred to as cell-specific reference signal (CRS) resource elements (RE). An LTE base station, for example, transmits these cell-specific reference signals (CRS's) on every third subcarrier across a channel, at predetermined time intervals.

User equipment, such as a cell phone, when tuned to a particular radio channel (which, for LTE, may have a channel bandwidth of 1.4, 3, 5, 10, 15 or 20 MHz, containing subcarriers spaced at 15 kHz intervals), receives the predetermined reference signals for the channel and uses these reference signals to generate respective channel estimates for individual subcarriers in the channel. Such channel estimates, $\hat{h}_{filt}(i)$, can be determined for a particular reference signal, i, by: i) calculating a set of unfiltered channel estimates, $\hat{h}_{CRS}(j)$, for a filter set of reference signals in the channel, j, located in a time and frequency window around the particular reference signal, i, and ii) applying a mathematical filter (such as a set of weights) to this set of unfiltered estimates, or to the unfiltered reference signals, j, in any other appropriate way, to generate a filtered channel estimate, $\hat{h}_{filt}(i)$.

However, the present applicant has recognised that the accuracy of such channel estimates, $\hat{h}_{filt}(i)$, can vary across the width of the radio channel, typically reducing significantly towards the edges of the channel. This is undesirable in all cases, but the applicant has recognised that this can be particularly problematic when communicating over narrow channels, such as the narrowband downlink channels of LTE Category-M1 (LTE-M), which have a transmission bandwidth of only 1.08 MHz, since a greater proportion of the channel estimates will be near the channel edges, compared with a wider channel.

The present invention seeks to provide a new approach to determining OFDM channel estimates that may provide better consistency across a channel.

SUMMARY OF THE INVENTION

From a first aspect, the invention provides a radio communication system, comprising:
a radio transmission system for transmitting OFDM data signals over respective channels of a plurality of predetermined radio channels, each channel having a respective fixed channel bandwidth and comprising a respective plurality of OFDM subcarriers, and for transmitting predetermined reference signals at predetermined times on a reference-signal set of the OFDM subcarriers;
a radio receiver, comprising a local oscillator and a channel filter,
wherein the radio receiver is configured to tune a channel of the plurality of radio channels by:
controlling the local oscillator to generate a periodic signal;
receiving radio signals from the radio transmission system and mixing the radio signals with the periodic signal to generate a mixed signal; and
passing the mixed signal through the channel filter,
wherein the radio receiver is configured to receive, from the radio transmission system, an OFDM data signal modulated on a set of OFDM subcarriers within the tuned channel,
wherein the channel filter has a passband that is wider than the channel bandwidth of the tuned channel, such that the channel filter passes i) said OFDM data signal; ii) an in-channel reference signal of the predetermined reference signals, received on an OFDM subcarrier within the tuned channel; and iii) an out-of-channel reference signal of the predetermined reference signals, received on an out-of-channel OFDM subcarrier located outside the tuned channel, and
wherein the radio receiver comprises channel estimation logic configured to use both i) the in-channel reference signal, and ii) the out-of-channel reference signal, to calculate a channel estimate for an OFDM subcarrier within the tuned channel.

From a second aspect, the invention provides a radio receiver for receiving an OFDM data signal from a radio transmission system that transmits OFDM data signals over respective channels of a plurality of predetermined radio channels, each channel having a respective fixed channel bandwidth and comprising a respective plurality of OFDM subcarriers, and that transmits predetermined reference signals at predetermined times on a reference-signal set of the OFDM subcarriers, wherein:
the radio receiver comprises a local oscillator and a channel filter;
the radio receiver is configured to tune a channel of the plurality of radio channels by:
controlling the local oscillator to generate a periodic signal;
receiving radio signals from the radio transmission system and mixing the radio signals with the periodic signal to generate a mixed signal; and
passing the mixed signal through the channel filter; and
the radio receiver is configured to receive, from the radio transmission system, an OFDM data signal modulated on a set of OFDM subcarriers within the tuned channel; and wherein:

the channel filter has a passband that is wider than the channel bandwidth of the tuned channel, such that the channel filter passes i) said OFDM data signal; ii) an in-channel reference signal of the predetermined reference signals, received on an OFDM subcarrier within the tuned channel; and iii) an out-of-channel reference signal of the predetermined reference signals, received on an out-of-channel OFDM subcarrier located outside the tuned channel; and the radio receiver comprises channel estimation logic configured to use both i) the in-channel reference signal, and ii) the out-of-channel reference signal, to calculate a channel estimate for an OFDM subcarrier within the tuned channel.

From a third aspect, the invention provides a radio communication method for receiving an OFDM data signal from a radio transmission system that transmits OFDM data signals over respective channels of a plurality of predetermined radio channels, each channel having a respective fixed channel bandwidth and comprising a respective plurality of OFDM subcarriers, and that transmits predetermined reference signals at predetermined times on a reference-signal set of the OFDM subcarriers, the method comprising:

a radio receiver tuning a channel of the plurality of the radio channels by:
  generating a periodic signal;
  receiving radio signals from the radio transmission system and mixing the radio signals with the periodic signal to generate a mixed signal; and
  passing the mixed signal through a channel filter; and the radio receiver receiving, from the radio transmission system, an OFDM data signal modulated on a set of OFDM subcarriers within the tuned channel, the method further comprising:
the channel filter having a passband that is wider than the channel bandwidth of the tuned channel, such that the channel filter passes i) said OFDM data signal; ii) an in-channel reference signal of the predetermined reference signals, received on an OFDM subcarrier within the tuned channel; and iii) an out-of-channel reference signal of the predetermined reference signals, received on an out-of-channel OFDM subcarrier located outside the tuned channel; and the radio receiver using both i) the in-channel reference signal, and ii) the out-of-channel reference signal, to calculate a channel estimate for an OFDM subcarrier within the tuned channel.

The method may further comprise the radio transmission system transmitting said OFDM data signals over said respective channels. It may further comprise the radio transmission system transmitting said predetermined reference signals at said predetermined times on the reference-signal set of the OFDM subcarriers.

Thus it will be seen that, in accordance with the invention, a radio receiver uses a channel filter that is wider than the tuned channel in order to receive at least one reference signal on a subcarrier that is outside the tuned channel of interest. It uses this out-of-channel reference signal when generating a channel estimate for a subcarrier within the tuned channel. In this way, a radio receiver may generate a filtered channel estimate for a subcarrier in a radio channel using a filter set of reference signals that extends beyond one or both edges of the tuned channel. The applicant has found that this approach can improve the accuracy of channel estimates towards the edge of the tuned channel, thereby providing greater consistency in the channel estimates across the whole width of the tuned channel.

This approach contrasts with a naïve implementation in which the channel filter would be sized to correspond to the width of the tuned channel, and the radio receiver would not make use of signals on any subcarriers located outside the tuned channel when generating channel estimates for subcarriers within the tuned channel. Reference signals from subcarriers within the channel would pass through the channel filter, while signals outside the tuned channel would be discarded—this includes OFDM data signals on adjacent radio channels, as well as reference signals on subcarriers located outside the tuned channel.

The plurality of predetermined radio channels may include one or more LTE Cat-M1 (LTE-M) channels, which may each have a fixed channel bandwidth of 1.08 MHz. In particular, the tuned channel may be an LTE-M channel. The plurality of predetermined radio channels may include one or more LTE channels, such as a 3, 5, 10, 15 or 20 MHz LTE channel. The predetermined radio channels may occupy distinct frequency ranges or two or more channel may overlap—e.g., a 1.08 MHz LTE-M channel may be located within a 20 MHz LTE channel. The plurality of radio channels may have a common channel bandwidths (e.g., a set of LTE-M channels, each being 1.08 MHz wide), or at least two of the channels may have different bandwidths from each other.

In embodiments of the present invention, the channel filter may be wider than the tuned channel by at least the width of one additional OFDM subcarrier. It may be wider by at least two, three, four or more OFDM subcarrier widths or subcarrier intervals. In some embodiments, the channel filter may pass a plurality of out-of-channel OFDM subcarriers, located outside the tuned channel, that carry respective out-of-channel reference signals. This plurality of out-of-channel OFDM subcarriers may all be located to one edge of the tuned channel (i.e., all having a higher frequency than the tuned channel, or all having a lower frequency than the tuned channel), or a first set of one or more of the out-of-channel OFDM subcarriers may be above the tuned channel in frequency, and a second set of one or more of the out-of-channel OFDM subcarriers may be below the tuned channel in frequency. The radio receiver may use a plurality of out-of-channel reference signals, on different out-of-channel OFDM subcarriers, to calculate the channel estimate for the OFDM subcarrier within the tuned channel. The radio receiver may, additionally or alternatively, use a plurality of out-of-channel reference signals on a single out-of-channel OFDM subcarrier to calculate the channel estimate for the OFDM subcarrier within the tuned channel.

The reference-signal set of the OFDM subcarriers may include every subcarrier across the plurality of radio channels, or it may consist of a subset of these subcarriers—e.g., at most every third subcarrier.

The radio receiver may calculate the channel estimate in any appropriate way. The radio receiver may calculate channel estimates for a plurality of OFDM subcarriers within the tuned channel. It may use a filter set of reference signals when calculating channel estimates. It may apply a set of filter weights to the filter set of reference signals. For example, it may calculate a weighted sum of the unfiltered reference signals in the filter set, or of unfiltered channel estimates for the reference signals in the filter set. However, in contrast to naïve approaches in which the filter set becomes distorted towards the edges of the tuned channel, in embodiments of the present invention the filter set may include out-of-channel reference signals; this may particularly be the case when calculating channel estimates towards the edge of the tuned channel.

In some embodiments, channel estimates are calculated using a filter window (i.e., a span of frequency and/or time that encompasses a filter set of one or more reference signals) that has a common frequency extent when calculating channel estimates for each of a plurality of OFDM subcarriers within the tuned channel. When calculating a channel estimate for a subcarrier located on the edge of the tuned channel, approximately half of the reference signals in the filter window may be out-of-channel reference signals, and half may be in-channel reference signals. The filter window may encompass two, five, ten or more subcarriers that carry reference signals. The filter window may have a constant or variable time extent. The filter window may have a constant or variable frequency extent. Thus the shape of the filter window may be constant over time or it may change over time. The filter window may be rectangular or any other appropriate shape. A set of filter weights may be applied to unfiltered reference signals within the filter window. The filter weights may be constant over time or they may change over time.

The channel filter may be sized to pass a number of out-of-channel OFDM subcarriers exactly equal to, or at least equal to, the number of subcarriers spanned by the filter window (or at least equal to half this number, if channel-edge distortion at only one edge of the channel is to be mitigated). In this way, when the channel filter is centred on the tuned channel, the filter window can be positioned (i.e. centred) at an edge of the tuned channel and still encompass the same number of reference signals as when the filter window is positioned wholly within the tuned channel. This can maintain a consistent power level and SNR for the channel estimates across the width of the channel. It can also ensure a symmetrical distribution of reference signals in frequency about the centre of the filter window, wherever the filter window is positioned in the channel, thereby allowing any sample timing errors to be averaged out consistently.

The radio receiver may be a direct-conversion (zero-IF) radio receiver. The mixed signal may be at baseband. The periodic signal may have a tuning frequency that is within the tuned channel.

Alternatively, the radio receiver may be a superheterodyne receiver. The periodic signal may cause the mixed signal to be down-converted to an intermediate frequency. The channel filter may be applied to the mixed signal at an intermediate frequency, or the mixed signal may be further down-converted—e.g., to baseband—before being passed through the channel filter.

The radio receiver may comprise an analogue-to-digital converter for converting the mixed signal to a digital signal.

The channel filter may be implemented in any appropriate way. It may comprise a plurality of filter stages. It may comprise one or more digital filters and/or one or more analogue filters. It may comprise a bandpass filter. It may be symmetrical in shape (i.e., having symmetrical roll off at each end). In some embodiments, the mixed signal may be at baseband, or may be shifted to baseband, and the channel filter may comprise a low-pass filter configured to act on the mixed signal at baseband. For example, if the filtering is applied at baseband, a channel filter with a passband of 1.8 MHz may be implemented as a low-pass baseband filter having a nominal width of 900 kHz. In general, references herein to the passband of a channel filter may be understood as referring to the width of the filter at the carrier frequency (or at an intermediate frequency). The radio receiver may comprise a digital or analogue mixer for mixing the signals.

It will be appreciated that the width of the channel filter passband may be defined in any appropriate way (e.g., the distance between the half-power points). What is important is that the channel filter is sufficiently wide that it can pass out-of-channel reference signals on one or more out-of-channel OFDM subcarriers with sufficient signal strength that the radio receiver can use these out-of-channel reference signals when calculating channel estimates.

The radio receiver may pass the mixed signal through the channel filter with the channel filter centred on the tuned channel; i.e., a centre point of the channel filter may be aligned with a centre frequency of the channel (after down-conversion). When the radio receiver is a direct-conversion receiver, the periodic signal may have a tuning frequency that is centred in the tuned channel. In this way, the accuracy of the channel estimates may be improved for both edges of the tuned channel symmetrically.

However, in some situations the radio transmission network may not transmit reference signals across the full width of the channel filter when it is centred on the tuned channel. For example, when the tuned channel is the first or last channel of a succession of channels, there may be no reference signals beyond one end of the tuned channel, or there may only be limited reference signals (e.g., where there is a guard band that is narrower than half the amount by which the channel filter is wider than the tuned channel). At least in some situations, the radio receiver may be configured to offset the channel filter from the centre of the tuned channel by an offset amount; i.e., a centre point of the channel filter may be offset from a centre frequency of the channel (after down-conversion). The offset amount may be such that the channel filter passes only spectrum occupied by OFDM subcarriers transmitted by the radio transmission system, and passes no spectrum outside these OFDM subcarriers.

The offset amount may be such that an edge of the channel filter is aligned with an edge of the spectrum occupied by OFDM subcarriers transmitted by the radio transmission system. When the radio receiver is a direct-conversion receiver, the periodic signal may have a tuning frequency that is offset from the centred of the tuned channel by said offset amount. The offset amount may equal an integer multiple of subcarrier intervals. When receiving an LTE signal, the offset may equal an integer number of physical resource blocks (PRBs). In this way, the channel filter can avoid passing signals that may lie outside a frequency band covered by the radio channels transmitted by the radio transmission system, which might otherwise interfere with the decoding of the OFDM signal or with the calculation of channel estimates for the tuned channel. By offsetting the channel filter, it may be possible to use the same channel filter (i.e., a filter with a fixed passband width) to tune 1.08 MHz LTE-M narrowband channels located within LTE channels of varied widths (e.g., 20 MHz and 5 MHz), while still benefiting from improved channel estimates, even when the LTE-M channel is located adjacent an edge of the LTE channel.

However, it is not essential that the channel filter has a fixed width passband. In some embodiments, the width of the channel filter is variable; it may be set to be smaller when tuning a first channel compared with when tuning a second channel. In particular, the channel filter width may be reduced when tuning the first or last channel of a succession of channels, so as to avoid passing spectrum in which there are no reference signals. A reduced channel filter may additionally be offset when tuning such an edge channel.

The OFDM data signal may be modulated over all of the OFDM subcarriers in the tuned channel. However, it may be modulated on a strict subset of the OFDM subcarriers. The radio receiver may be configured to receive allocation data from the radio transmission system; the allocation data may communicate (e.g., encode) the set of OFDM subcarriers within the tuned channel on which the OFDM data signal will be communicated. The radio receiver may be configured to respond to any allocation of OFDM subcarriers that the radio transmission system may communicate to the radio receiver by decoding the OFDM data signal from the allocated subcarrier; it may disregard data signals on any unallocated OFDM subcarriers. The radio receiver may be configured to respond to changes in the allocation while the OFDM data signal is being received. The allocation data may also communicate one or more time slots within which the OFDM data signal will be communicated.

The predetermined reference signals may be reference symbols, such as predefined QPSK di-bits. The radio receiver preferably knows, or is able to calculate, the predetermined reference signals and the predetermined times at which they are transmitted.

The OFDM data signals may be modulated in any appropriate way—e.g., using phase-modulation and/or frequency-modulation and/or amplitude-modulation. The data signals are preferably digital signals.

The channel estimates may be used for coherent demodulation, or for measuring the channel quality, or for any other purpose. The radio receiver may use one or more channel estimates to calculate a signal power estimate and/or a noise power estimate and/or a signal-to-noise ratio estimate for a particular reference signal or particular subcarrier, or for the tuned channel as a whole. The radio receiver may send information derived from the channel estimate for an subcarrier to the radio transmission system, which may use the information to control transmissions from the radio transmission system.

The radio transmission system may be a single radio transmitter. However, in other embodiments the radio transmission system comprises a network of two or more linked radio transmitters or base stations. The radio transmission system may form part or all of a cellular communications network.

In some embodiments, the radio transmission system comprises an Long Term Evolution (LTE) radio transmission system. The reference signals may be cell-specific reference signals (CRS's)—i.e., respective CRS resource elements (RE's). The OFDM data signal could be any category of LTE signal. The radio channels could be 20 MHz, 15 MHz, 10 MHz or 5 MHz channels, and the OFDM data signal could be a signal in an LTE category wherein the data signal may occupy all of such a channel (e.g., Cat-0, Cat-3 or Cat-4). In this case, the channel filter will be wider than 20, 15, 10 or 5 MHz, respectively.

However, in a preferred set of embodiments, the radio channels include one or more LTE Cat-M1 (LTE-M) channels, having a fixed width of 1.08 MHz. The OFDM data signal may be an LTE-M signal. At any moment in time, the OFDM data signal may be transmitted over all six physical resource blocks (PRBs) of the tuned LTE-M channel, or it may be allocated a subset of these PRBs. The radio transmission system may also transmit one or more categories of LTE signal other than Cat-M1 on other subcarriers in a common frequency band with the LTE-M channels. The out-of-channel CRS or CRS's may be transmitted in one or more LTE-M channels adjacent the tuned channel, or they may be transmitted in an LTE channel that is not an LTE-M channel.

Although the nominal bandwidth of the tuned LTE-M channel is 1.08 MHz, the channel filter is wider than this, in order to pass the one or more out-of-channel CRS's. It may be sized to pass one or more PRBs that are wholly located outside the tuned LTE-M channel over which the OFDM data signal is transmitted—for example, it may be sized to pass two or four PRBs outside the tuned channel. Note that, in some situations, the radio transmission system may not transmit data or CRS's on all of these PRBs—e.g., when the tuned LTE-M channel is located at the edge of an 5 MHz LTE band, as already described above in connection with optionally offsetting the channel filter. However, having a radio filter of this size (e.g., four PRBs wider than the 1.08 MHz channel width) allows the radio receiver to pass CRS's from these out-of-channel PRBs where these are available. Thus, in some preferred embodiments, the channel filter has a passband (at the carrier frequency) that is at least 1.26 MHz wide, and that is preferably 1.8 MHz or more wide. Note that this could be implemented as a low-pass filter, operating at baseband, of width at least 630 kHz or preferably 900 kHz or more.

The radio receiver may comprise a further channel filter having a 1.08 MHz passband. It may use this further channel filter, instead of (or in addition to) the wider channel filter, when tuning a 1.08 MHz LTE-M channel where the radio transmission system does not transmit any usable CRS's on subcarrier frequencies adjacent the LTE-M channel—e.g., when the LTE-M channel is transmitted within a 1.4 MHz LTE system channel.

The radio receiver may comprise decoding logic for decoding the OFDM data signal.

The channel estimation logic and/or decoding logic and/or the radio receiver more generally may comprise electronic circuitry for performing the described operations. It may comprise an electronic circuit or circuit portion. It may be implemented using application-specific circuitry (e.g., an ASIC), or it may comprise one or more FPGAs, MCUs and/or processors, which may include one or more GPUs or DSPs. It may perform some or all operations in hardware, or may perform some or all operations in software. In some embodiments, the channel estimation logic may be purely software—i.e., consisting of software instructions which, when executed on a suitable processing system, cause the processing system to perform the described operations, or it may be a hard-coded logic device.

The radio receiver may also include a radio transmitter. The radio receiver may comprise a radio-on-a-chip device. The radio receiver may be a machine-to-machine (M2M) communication device. It may be LTE-M user equipment.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
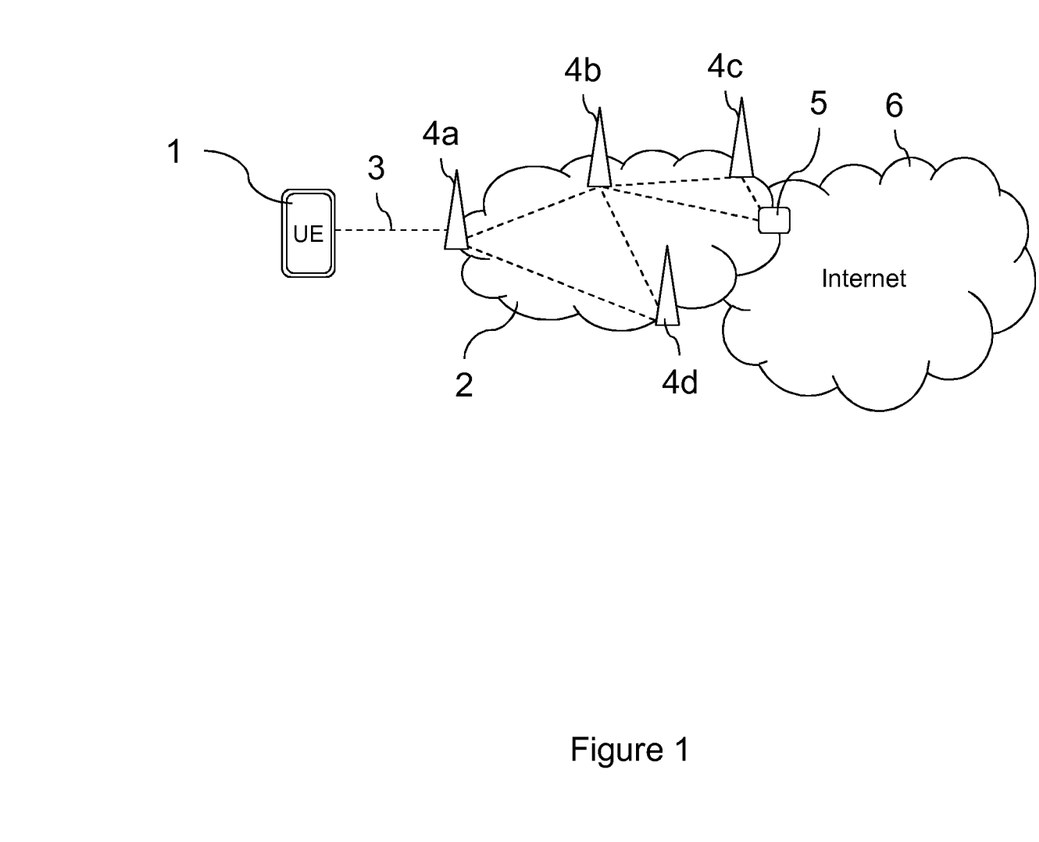
FIG. 1 is a schematic drawing of a telecommunications system in which the invention can be implemented.

FIG. 1 shows a User Equipment (UE) device 1, such as a wireless temperature sensor, which contains a radio receiver and a radio transmitter for communicating with a cellular telecommunications network 2 which supports LTE Cat-M1 (LTE-M) communication.

The device 1 can receive data from the network 2 over a radio link 3 on an LTE-M channel. The network 2 may comprise an Evolved Universal Terrestrial Radio Access Network (E-UTRAN). The network 2 includes a number of base stations 4a-4d, which may be LTE eNodeB's. A Serving Gateway 5 enables the device 1 to communicate over the Internet 6—e.g., with a remote server (not shown). Other standard components of an LTE network are omitted for simplicity.

Any number of other devices may be receiving data from the same base station 4a at the same time as the device 1. These may be other LTE-M devices, or devices using other categories of LTE, such as for voice communication. The network 2 allocates subcarrier frequencies and time slots to each device by allocating unique physical resource blocks (PRBs) to each device, in known manner.

The device 1, and the system as a whole, embody the present invention. The system and device 1 can be used to implement methods of the present invention, as described below.

Figure 2:
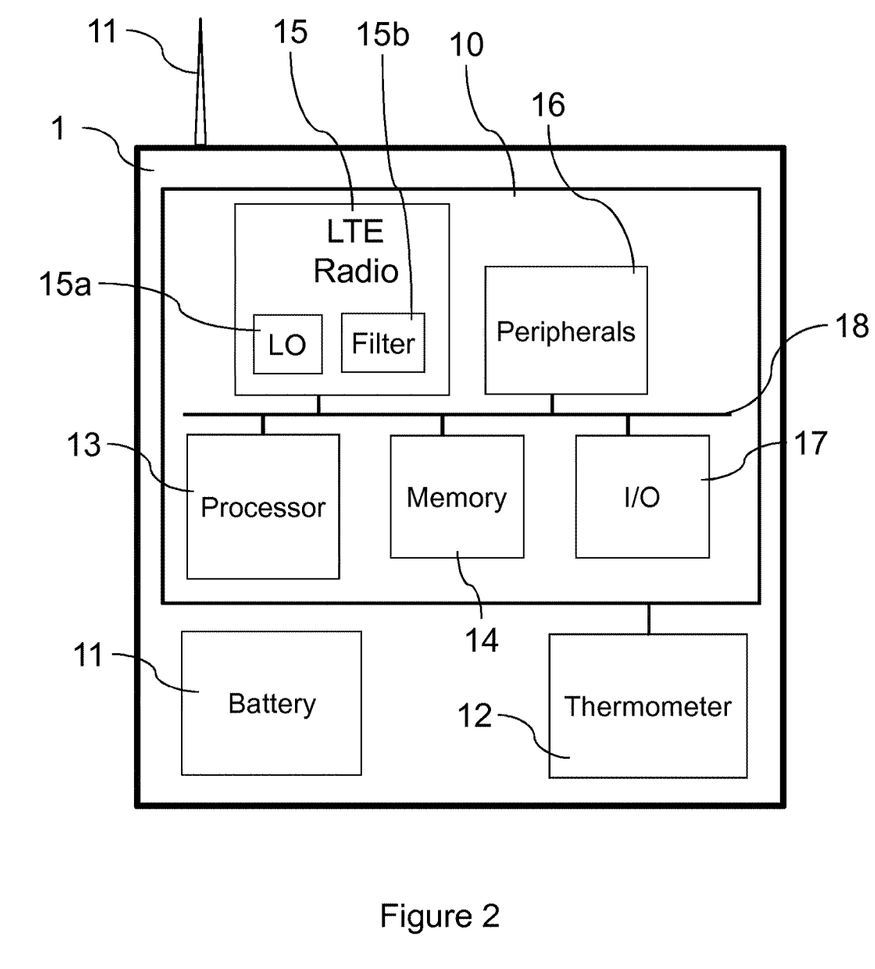
FIG. 2 is a schematic drawing of a wireless temperature sensor embodying the invention.

FIG. 2 provides more detail of the device 1, which, in this example, is a wireless temperature sensor. (Of course, the invention may also be implemented in many other types of device.)

The wireless temperature sensor device 1 contains an integrated-circuit radio-on-a-chip 10, a battery 11 and a thermometer 12. It may also contain other discrete components, such as PCBs, oscillators, capacitors, resistors, a housing, user interface features, etc. which are omitted from FIG. 2 for the sake of simplicity.

The radio chip 10 contains a processor 13, memory 14 (which may include volatile and non-volatile memory types), an LTE Cat-M1 (LTE-M) radio 15, general peripherals 16 (which may include a hardware cryptography engine, digital-to-analogue converters, timers, etc.) and input/output peripherals 17 (e.g., a USB interface). These elements are all connected to a bus system 18 (e.g., compliant with the Arm™ Advanced Microcontroller Bus Architecture) which supports direct memory access (DMA) to the memory-mapped peripherals 16, 17. In one example, the processor 13 is an Arm™ Cortex™-M series processor, although it could be any type of processor.

The LTE-M radio 15 includes a direct-conversion receiver, as well as a radio transmitter. It contains digital logic and analogue components that will be familiar to one skilled in the art. Among other components, the radio 15 includes a local oscillator 15a and a channel filter 15b for receiving LTE-M signals. The channel filter 15b is switchable between a 1.08 MHz passband width and a 1.8 MHz passband width.

The radio 15 may contain a further general-purpose processor (not shown) for implementing the LTE-M radio protocol using software. The LTE-M radio 15 and/or radio chip 10 may contain other conventional components, such as DSPs, amplifiers, filters, ADCs, DACs, etc. The device 1 also has an antenna 11 which is connected to the LTE-M radio 7 via appropriate off-chip components (not shown).

The memory 14 stores software which is executed by the processor 13 for controlling the operation of the wireless temperature sensor device 1. In use, the processor 13 uses the I/O peripherals 17 to fetch temperature readings from the thermometer 12 at intervals and writes these to the memory 14. The processor 13 sends a log to a remote server at periodic intervals (e.g., hourly, or daily). The device 1 can also receive data from the remote server, such as acknowledgement messages, new configuration settings, and firmware updates.

When the device 1 is to receive data from the cellular telecommunications network 2 on a particular 1.08 MHz wide LTE-M channel, the radio 15 sets the local oscillator 15*a* so that it generates a periodic signal for tuning the LTE-M channel. Unless the channel is the first or last channel in a 15 MHz, 10 MHz or 5 MHz LTE band, the local oscillator 15*a* is set to the centre of the LTE-M channel. If the channel is transmitted on a 1.4 MHz LTE band, the channel filter 15*b* is set to 1.08 MHz; otherwise it is set to 1.8 MHz. The radio 15 will be instructed by the network which PRB's are allocated for the downlink at any moment in time, and it receives and decodes an OFDM signal on these PRB's. At intervals, the radio 15 also calculates channel estimates for subcarrier frequencies within the LTE-M channel. It will do this while receiving the OFDM signal (optionally even when there is no control or data transmission allocated to the radio 15). It does this using CRS RE's within the LTE-M channel and using CRS RE's outside the LTE-M channel. It generates filtered channel estimates, centred on particular CRS RE's within the LTE-M channel, by centring a rectangular filter window (whose frequency width and time width may be fixed or may change over time) on the particular CRS RE in the LTE-M channel and applying filter weights to all of the unfiltered CRS RE's that lie within the filter window. Summing the products produces the desired filtered channel estimate. The radio 15 may use information derived from these filtered channel estimates, such as a signal-to-noise ratio for the channel, for conventional purposes. Among other things, it may communicate such information to the network 2.

The transmission of data back to the network 2 is performed in a conventional manner.

A shortcoming with a naïve approach to calculating filtered channel estimates, using a channel filter that is equal in width to the channel (i.e., 1.08 MHz) is illustrated with reference to FIG. 3.

Figure 3:
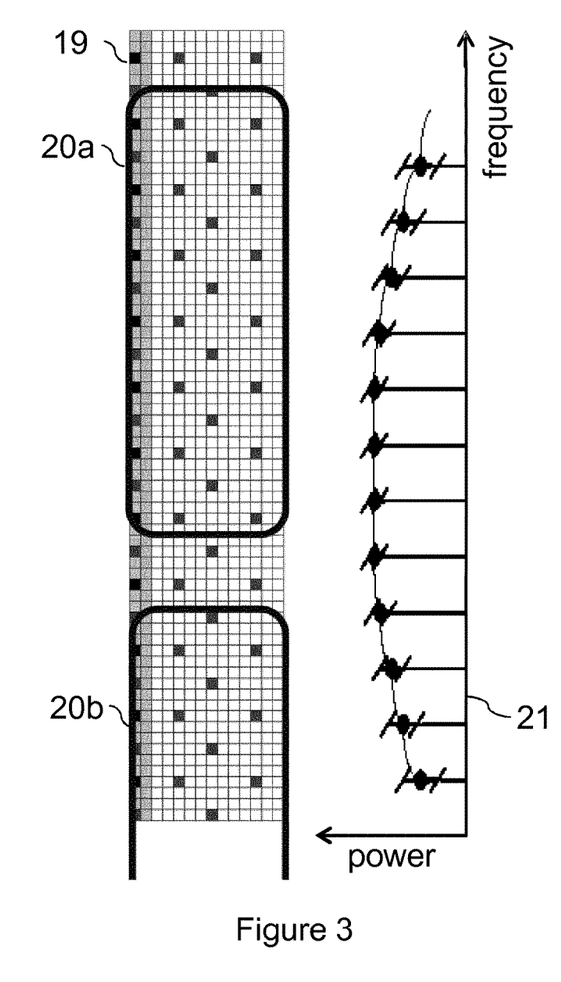
FIG. 3 is a diagram of a resource grid for an LTE-M channel with a sliding channel-estimate filter window, alongside a plot of signal power at different filter window positions.

FIG. 3 shows a resource grid 19 for a 1.08 MHz LTE-M channel. A filter window having a temporal extent of 1 millisecond and a frequency extent of approximately 600 kHz (forty×15 kHz subcarriers) is moved across the channel in order to calculate filtered channel estimates for different RE's within the channel. When the filter is centred on an RE such that the filter window 20*a* is fully within the channel, the filter can have the full 600 kHz frequency extent. However, when the filter window 20*b* is centred on an RE that is less than 300 kHz from the edge of the channel, there is a portion of the filter window 20*b* that extends outside the channel filter, which does not contain any CRS RE's, because these have been filtered by the channel filter. The effective size of the filter window 20*a* is therefore reduced. In this example, the second filter window 20*b* has a frequency extent of only approximately 285 kHz (19×15 kHz subcarriers), and the CRS RE's are no longer distributed symmetrically about the particular subcarrier at the centre of the filter window 20*b*.

Alongside the resource grid 19 is a plot 21 of signal power at different filter window positions over the resource grid 19. The plot 21 is vertically aligned with the resource grid 19 such that each point on the plot 21 corresponds to a respective frequency for the centre of the filter window. The error bars at each point indicate the signal-to-noise ratio (SNR) for the particular filtered channel estimate.

The plot 21 shows that, using a naive approach, for subcarriers near the channel edge, the channel estimates are lower in amplitude (e.g., up to a half or less) and, even more significantly, have poorer SNR (e.g., −3 dB or worse). This is because there are fewer unfiltered channel estimates available for inputting to the filter averaging.

Figure 4:
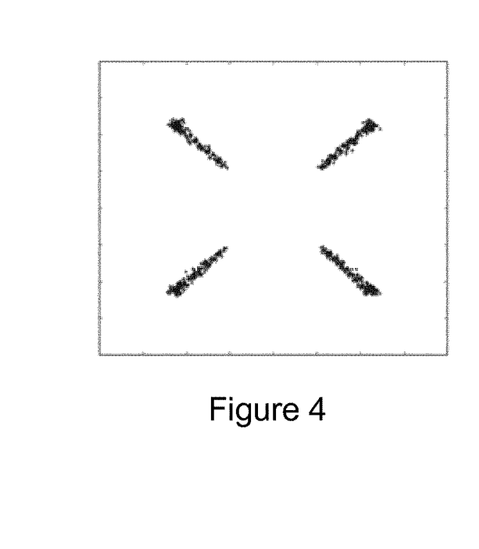
FIG. 4 is a simulated constellation diagram for filtered channel estimates calculated at CRS resource elements across an LTE-M channel using a channel filter equal to the channel width.

FIG. 4 shows how the constellation for the QPSK filtered channel estimates is distorted into four lines, due to the reduced power near the channel edges, rather than being clustered in four spots with constant amplitude.

Figure 5:
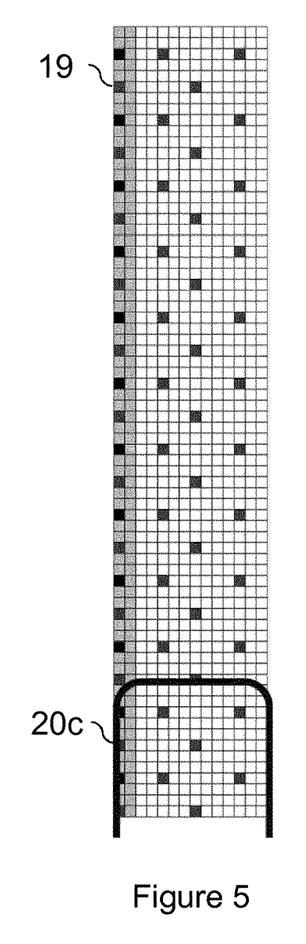
FIG. 5 is an LTE resource grid showing a channel-estimate filter window centred on a CRS resource element at the bottom edge of the LTE-M channel.

FIG. 5 shows a filter window 20*c*, nominally covering 16 CRS, centred on a subcarrier right on the bottom edge of the LTE-M channel 19. Half of the filter window 20*c* is thus outside the LTE-M channel, which is the worst case situation.

The SNR after equalization, $SNR_{equ}$, can be approximated as:

$$SNR_{equ} = \frac{SNR_{inp} \cdot SNR_{che}}{SNR_{inp} + SNR_{che} + 1}$$

where $SNR_{inp}$ is the "input SNR", and $SNR_{che}$ is the "channel-estimate SNR". Equalization here means that the received RE is multiplied with the complex conjugate of the channel estimate, after which this formula gives the resulting SNR.

In this example, the channel estimate is averaged over 16 CRS's, such that $SNR_{che} = SNR_{inp} + 12$ dB.

The innermost channel estimate of the filter window 20*c* has relative SNR=0.875. The outermost channel estimate of the filter window 20*c* will have relative SNR=0.5 (−3 dB), which is the maximum loss.

In addition to the signal strength and SNR problems, a narrow channel filter also leads to sample timing error issues, due to the asymmetrical distribution of the CRS RE's within the filter window near the channel edge.

Figure 6:
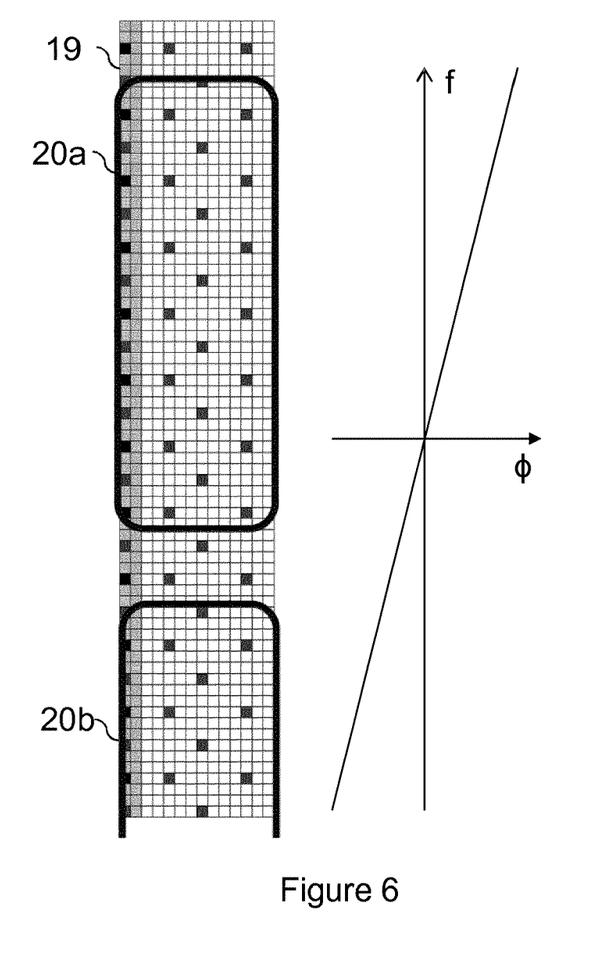
FIG. 6 is the resource grid of FIG. 3 alongside a plot of phase error against frequency across the LTE-M channel when using a channel filter equal to the channel width.

FIG. 6 shows the same resource grid 19 as FIG. 3, alongside a plot of phase error against frequency. Any sampling timing error creates a linear rotation of the subcarriers. For subcarriers near the channel centre, this is not problematic as the error affects CRS RE's symmetrically within the filter window, with positive errors cancelling out an equal number of negative errors. However, near the channel edge, with a narrow channel filter, the phase of the channel estimate will be calculated incorrectly due to non-symmetric averaging of CRS's, because of the absence of CRS RE's beyond the edge of the channel.

Figure 7:
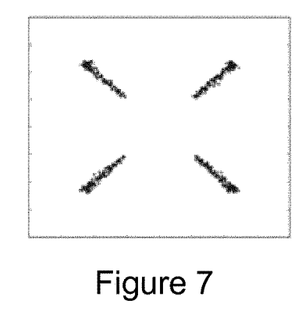
FIG. 7 is a simulated constellation diagram showing no timing error.
Figure 8:
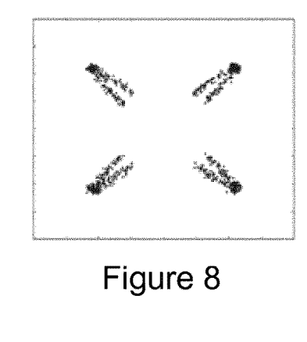
FIG. 8 is a simulated constellation diagram showing a timing error of 0.25 samples when using a channel filter equal to the channel width.
Figure 9:
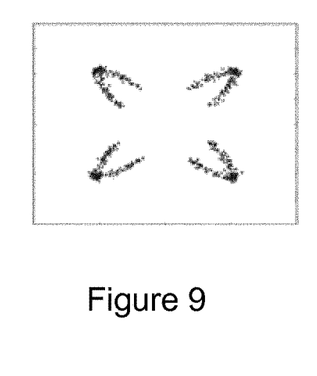
FIG. 9 is a simulated constellation diagram showing a timing error of 0.5 samples when using a channel filter equal to the channel width.
Figure 10:
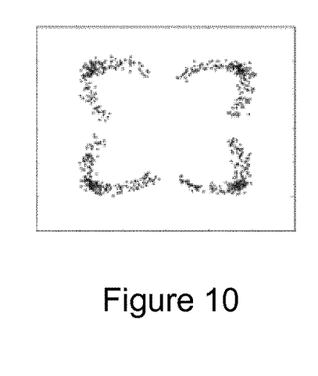
FIG. 10 is a simulated constellation diagram showing a timing error of one whole sample when using a channel filter equal to the channel width.

FIGS. 7, 8, 9 and 10 shows the effect of progressively large timing errors for channel estimates distributed across the channel. FIG. 7 shows the case with no timing error. FIG. 8 shows a timing error of 0.25 samples. Channel estimates towards the channel edges have lower amplitude and are spread out in phase, positively and negatively for the two ends of the channel. FIG. 9 shows a timing error of 0.5 samples. FIG. 10 shows a timing error of one whole sample.

Figure 11:
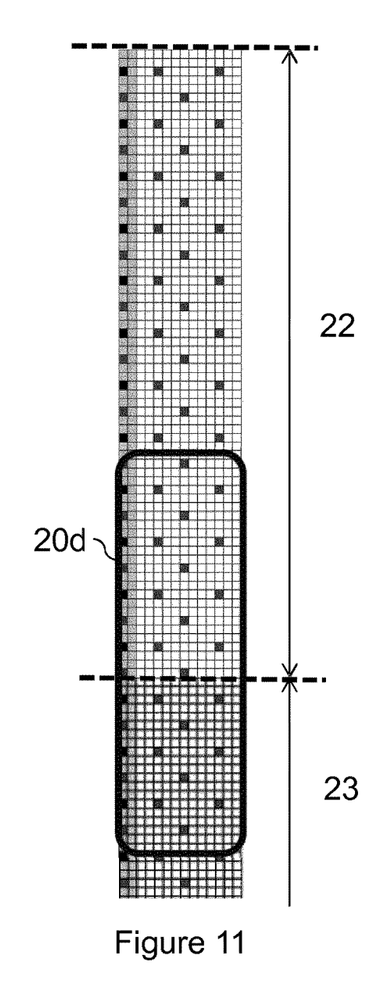
FIG. 11 is a diagram of a resource grid for an LTE-M channel when using a channel filter that is wider than the channel, showing extending beyond the lower edge of the channel.

FIG. 11 shows how this problem is mitigated in embodiments of the invention by using a wider channel filter. In the example shown in FIG. 11, the filter window 20*d* extends beyond the edge of the tuned 1.08 MHz wide LTE-M channel 22. However, because the channel filter is 1.8 MHz, CRS RE's from the adjacent LTE spectrum 23 (which could be another LTE-M channel, or a different LTE channel) are also present within the filter window 20*d*.

Figure 12:
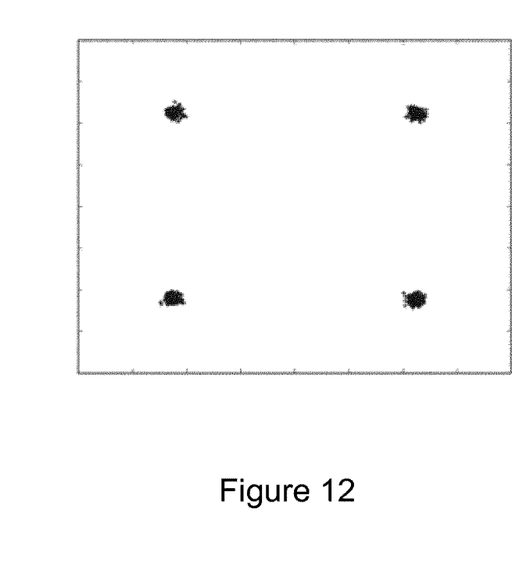
FIG. 12 is a simulated constellation diagram for filtered channel estimates calculated at CRS resource elements across an LTE-M channel using a uniform-sized filter window.

In this case, the filtered channel estimates from across the channel 22 have the constellation diagram shown in FIG. 12, in which there is no phase error and in which there is a consistent amplitude.

Figure 13:
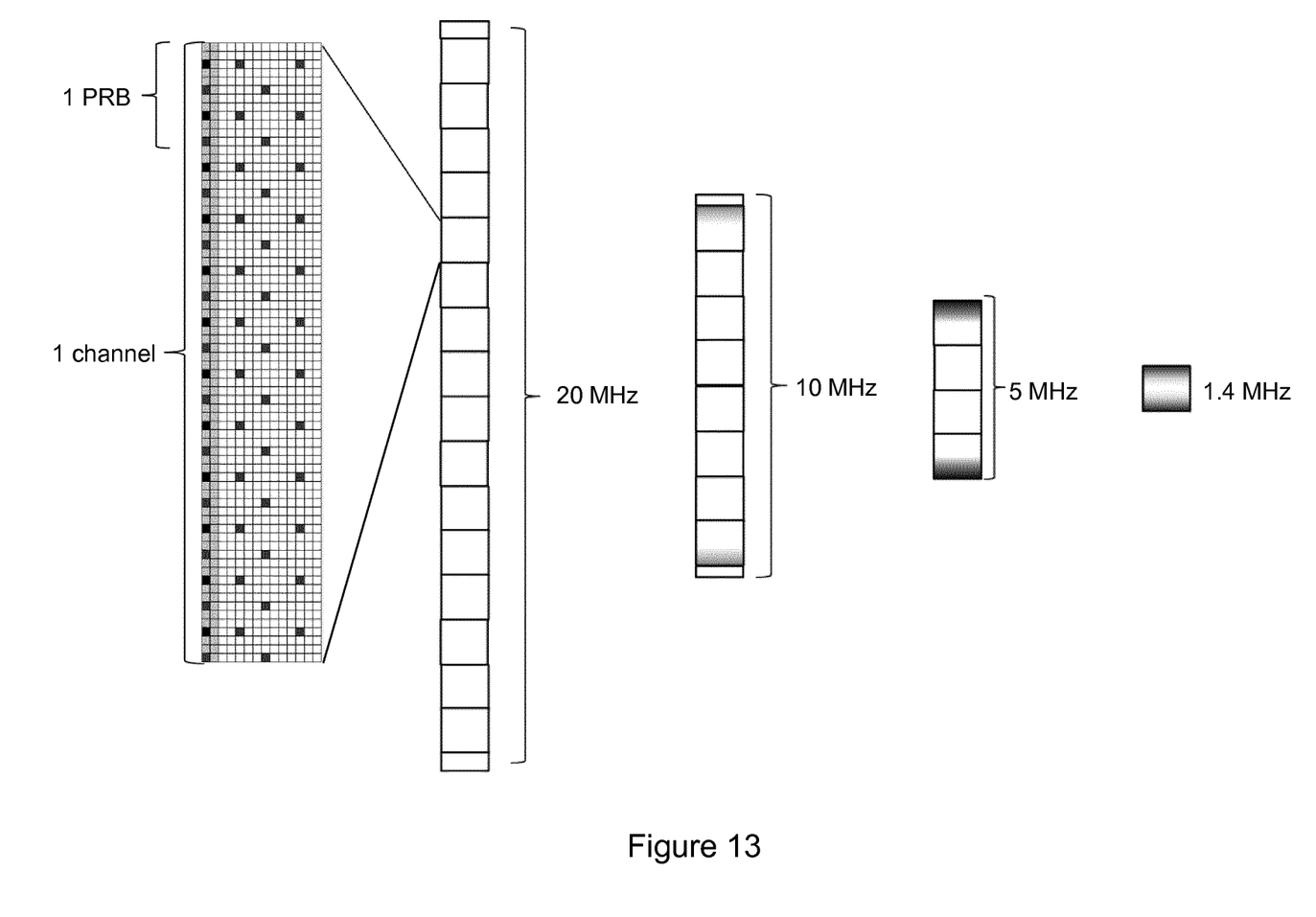
FIG. 13 is a diagram of a resource grid of an LTE-M channel in the context of 20 MHz, 10 MHz, 5 MHz and 1.4 MHz LTE system channels.

FIG. 13 shows how one narrowband LTE-M channel, consisting of six PRBs, can fit within 20 MHz, 10 MHz, 5 MHz and 1.4 MHz LTE system channels.

Each PRB consists of 12 subcarriers (each 15 kHz apart, so occupying 180 kHz in total)×7 OFDM symbols (occupying 0.5 ms in total).

A 20 MHz LTE system channel fits sixteen LTE-M channels plus two unused PRB's at each edge. A 10 MHz LTE system channel fits eight LTE-M channels plus one unused PRB at each edge. A 5 MHz LTE system channel can fit four LTE-M channels. A 1.4 MHz LTE system channel is fully occupied by one LTE-M channel, with an allowance for filter roll-off (since the actual bandwidth used for LTE-M signals is only 1.08 MHz).

In a 20 MHz LTE channel, using a 1.8 MHz channel filter, instead of 1.08 MHz, completely mitigates the channel-edge issues, even for the LTE-M channel at the edge of the system channel, because the two unused PRB blocks still contain CRS RE's which allow the filter window to be fully filled with CRS RE's.

In a 10 MHz LTE channel, using a 1.8 MHz channel filter completely mitigates the channel-edge issues for all LTE-M channels except the two edge channels. For these, the problem is still partly mitigated, as represented by the light grey shading for these LTE-M blocks in FIG. 13.

Although not illustrated here, the situation for a 15 MHz system channel is similar to that of a 10 MHz channel in that there is one unused PRB at each edge of the system channel. There is also a third unused PRB located in the middle of the system channel. The two edge PRBs allow for partial mitigation of the channel-edge distortions, as with the 10 MHz channel. The CRS RE's in the central unused PRB can be used for fully mitigating errors in the adjacent LTE-M channels.

In a 5 MHz LTE channel, the 1.8 MHz channel filter completely mitigates the channel-edge issues for the two central LTE-M channels, but not the outer two LTE-M channels (as represented by the dark grey shading for these two blocks). This is still a significant improvement on naive approaches.

In a 1.4 MHz, a 1.8 MHz channel filter cannot be used, and so the radio 15 switches the filter 15b to 1.08 MHz when operating in this band.

Figure 14:
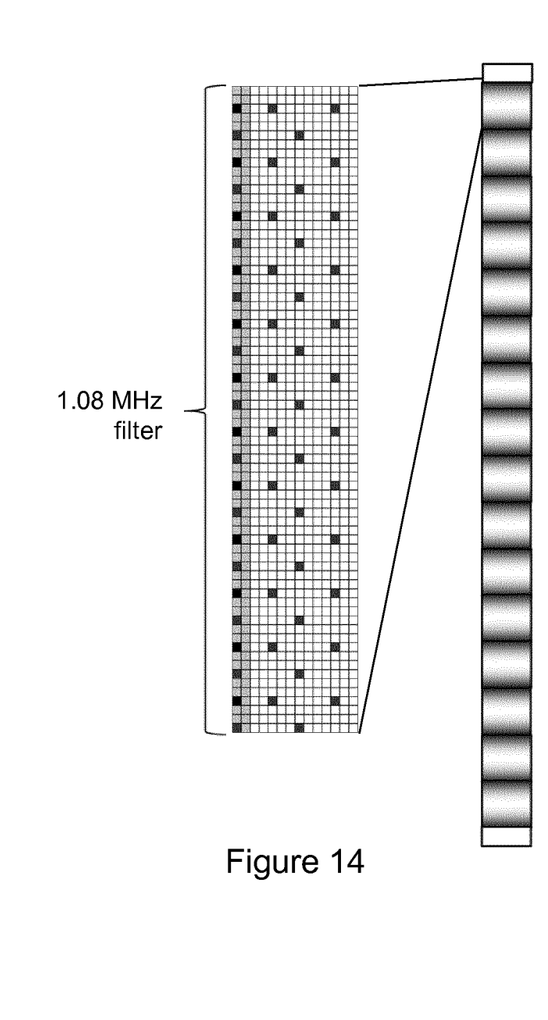
FIG. 14 is a diagram of a resource grid of an LTE-M channel, tuned with a 1.08 MHz channel filter, within a 20 MHz LTE system channel, illustrating band edge problems across the system channel.
Figure 15:
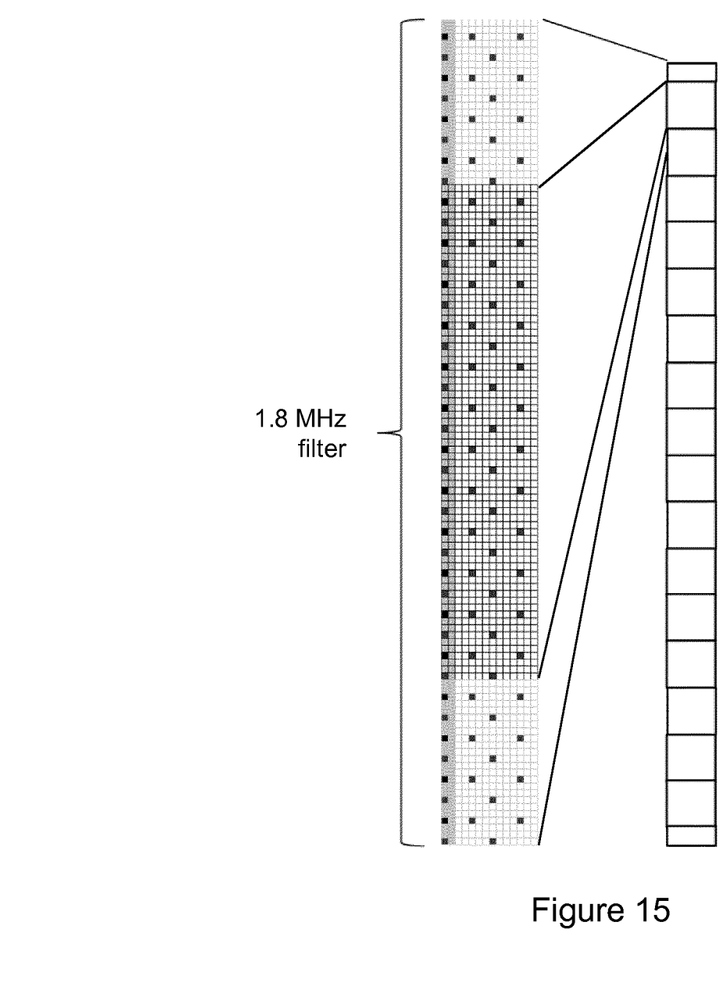
FIG. 15 is a diagram of a resource grid of an LTE-M channel, tuned with a 1.8 MHz channel filter, within a 20 MHz LTE system channel, illustrating no band edge problems across the system channel.

FIGS. 14 & 15 contrast 1.08 MHz channel filtering with wider 1.8 MHz channel filtering in a 20 MHz LTE system channel. The dark grey shading in each LTE-M channel block in FIG. 14 represents the channel-edge power and phase errors that have already been described above. FIG. 15 shows how a 1.8 MHz channel filter encompasses two PRB's at each side of the LTE-M channel and so mitigates these problems. In this case, the local oscillator 15a can be set to the centre of the tuned LTE-M channel, wherever the channel is in the 20 MHz band, such that the channel filter is centred on the tuned LTE-M channel.

Figure 16:
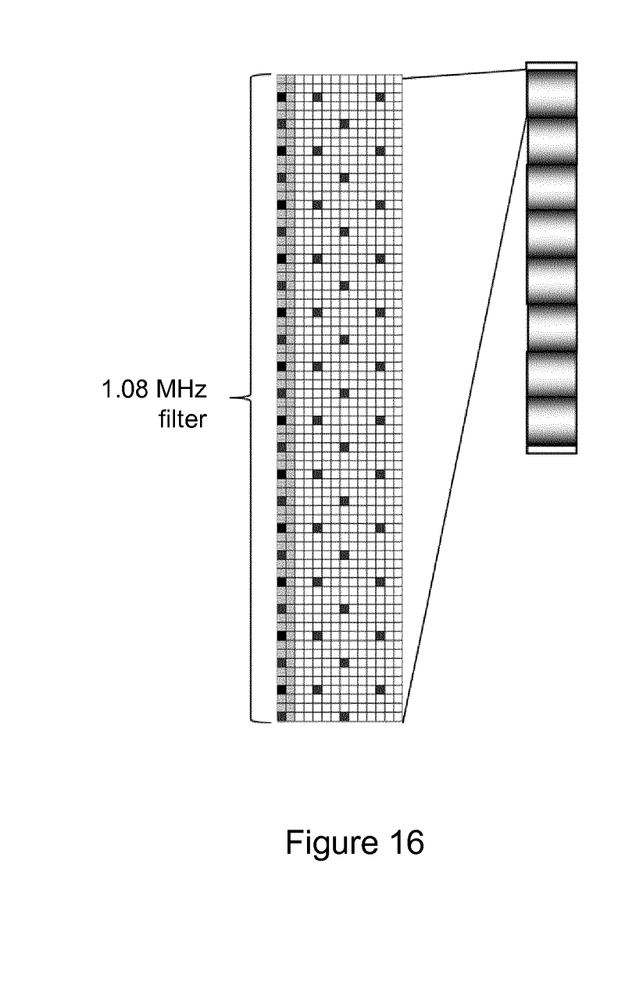
FIG. 16 is a diagram of a resource grid of an LTE-M channel, tuned with a 1.08 MHz channel filter, within a 10 MHz LTE system channel, illustrating band edge problems across the system channel.
Figure 17:
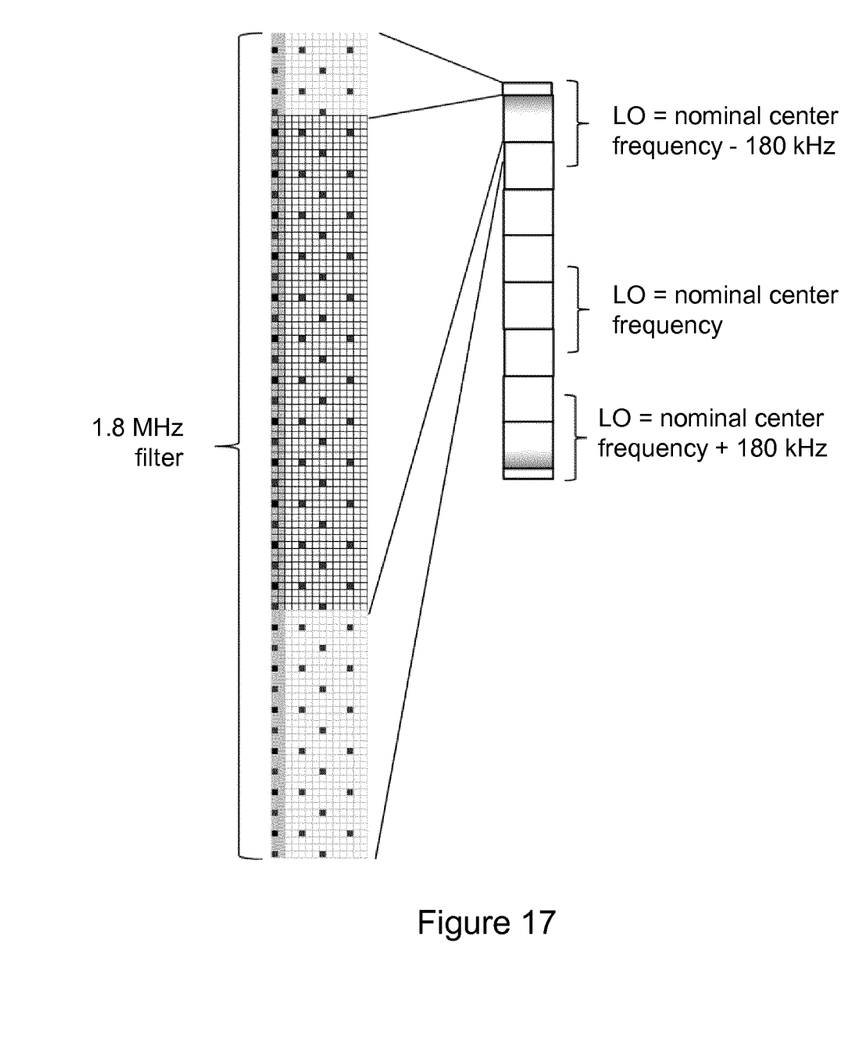
FIG. 17 is a diagram of a resource grid of an LTE-M channel, tuned with a 1.8 MHz channel filter, within a 10 MHz LTE system channel, illustrating no band edge problems across the system channel.

FIGS. 16 & 17 contrast 1.08 MHz channel filtering with wider 1.8 MHz channel filtering in a 10 MHz LTE system channel. The dark grey shading in each LTE-M channel block in FIG. 16 represents the channel-edge power and phase errors that have already been described above. FIG. 17 shows how a 1.8 MHz channel filter encompasses two PRB's at each side of the LTE-M channel for all LTE-M channels except the end channels. For these two LTE-M channels, only one PRB is available at the end of the system channel. To avoid passing signals outside the 10 MHz LTE system channel, when tuning one of these edge LTE-M channels, the local oscillator (LO) 15a is set to the nominal centre frequency plus or minus 180 kHz (i.e. one PRB), so that the outer edge of the channel filter is aligned with the edge of the LTE system channel. For all other LTE-M channels, the LO 15a is tuned to the centre of the LTE-M channel.

When tuning the edge LTE-M channels, FIG. 17 shows the inner edge of the filter as being three PRB's (540 kHz) into the adjacent LTE-M channel, due to the fixed 1.8 MHz channel filter width. However, other embodiments may use a variable-width channel filter, in which case the filter width could be set to 1620 kHz (i.e., 1.8 MHz minus 180 kHz) when tuning such an edge channel. The LO offset could then be set to the nominal centre frequency plus or minus 90 kHz (i.e., half a PRB), so that the outer edge of the channel filter is aligned with the edge of the LTE system channel, but with the inner edge then being only two PRB's (360 kHz) into the adjacent LTE-M channel.

Figure 18:
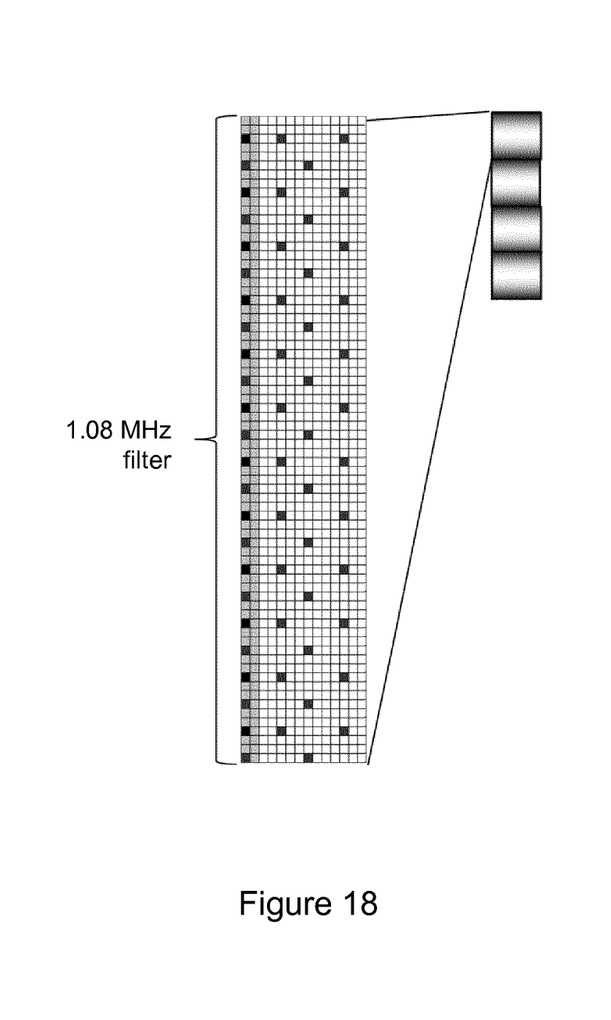
FIG. 18 is a diagram of a resource grid of an LTE-M channel, tuned with a 1.08 MHz channel filter, within a 5 MHz LTE system channel, illustrating band edge problems across the system channel.
Figure 19:
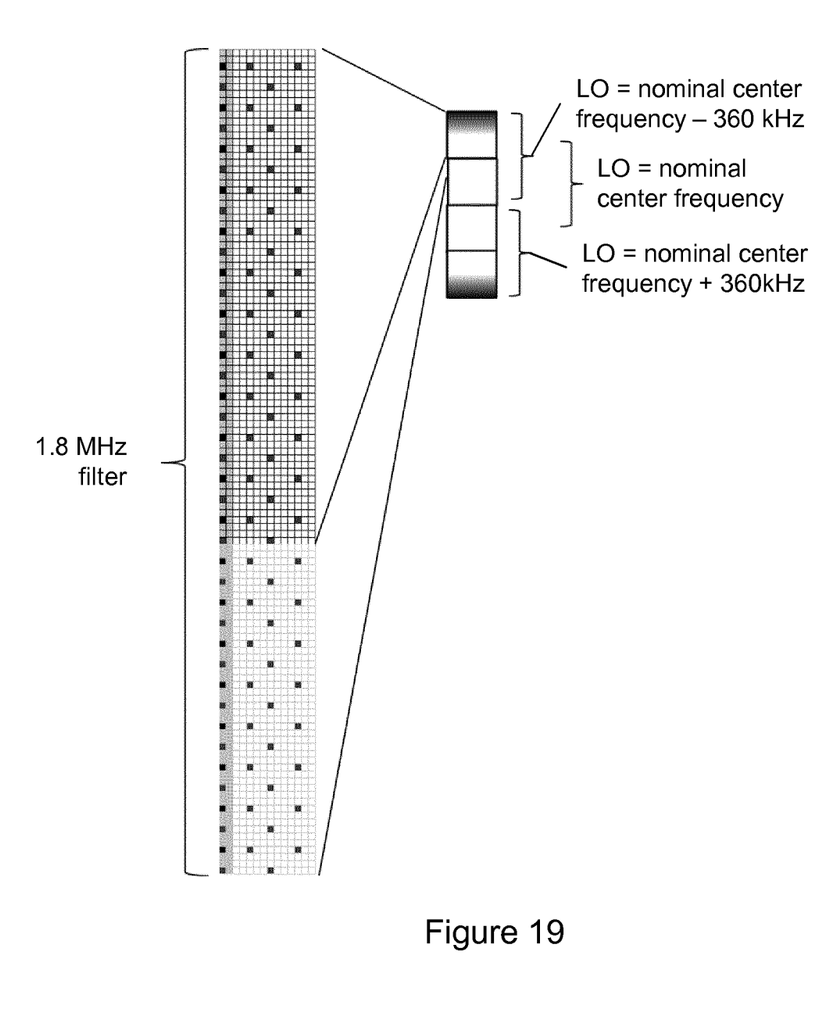
FIG. 19 is a diagram of a resource grid of an LTE-M channel, tuned with a 1.8 MHz channel filter, within a 5 MHz LTE system channel, illustrating no band edge problems across the system channel.

FIGS. 18 & 19 contrast 1.08 MHz channel filtering with wider 1.8 MHz channel filtering in a 5 MHz LTE system channel. The dark grey shading in each LTE-M channel block in FIG. 18 represents the channel-edge power and phase errors that have already been described above. FIG. 19 shows how a 1.8 MHz channel filter is centred on the two central LTE-M channels, when these are being tuned, but is offset by 360 kHz (i.e. two PRB's) when tuning the outermost LTE-M channels, so as to avoid passing signals received outside the 5 MHz LTE system channel.

Figure 20:
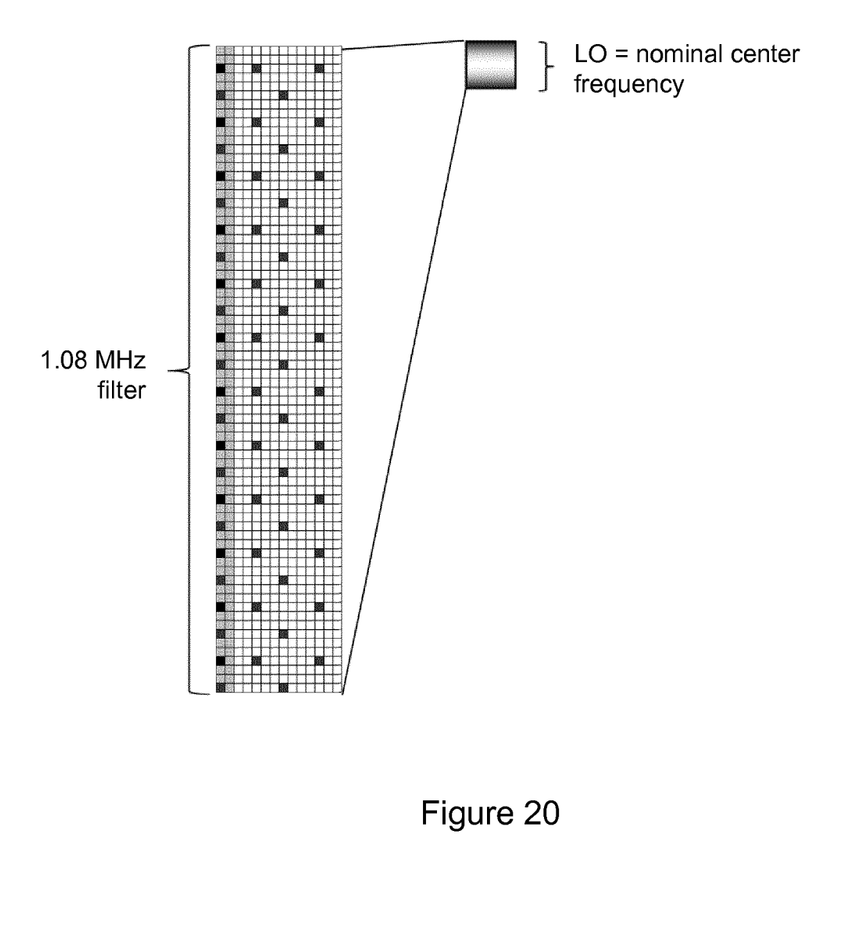
FIG. 20 is a diagram of a resource grid of an LTE-M channel, tuned with a 1.08 MHz channel filter, within a 1.4 MHz LTE system channel, illustrating unavoidable band edge problems.

FIG. 20 shows an LTE-M channel in a 1.4 MHz LTE system channel being tuned with the channel filter 15b set to a 1.08 MHz width. In this case the filter is located centrally in the channel. No mitigation of the channel edge problems is possible by widening the channel filter.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio receiver for receiving an OFDM data signal from a radio transmission system that transmits OFDM data signals over respective channels of a plurality of predetermined radio channels, each channel having a respective fixed channel bandwidth and comprising a respective plurality of OFDM subcarriers, and that transmits predetermined reference signals at predetermined times on a reference-signal set of the OFDM subcarriers, wherein the radio receiver comprises a local oscillator and a channel filter, wherein the radio receiver is configured to tune a channel of the plurality of the radio channels by:
controlling the local oscillator to generate a periodic signal;
receiving radio signals from the radio transmission system and mixing the radio signals with the periodic signal to generate a mixed signal; and
passing the mixed signal through the channel filter, wherein the radio receiver is configured to receive, from the radio transmission system, an OFDM data signal modulated on a set of OFDM subcarriers within the tuned channel, wherein the channel filter has a passband that is wider than the channel bandwidth of the tuned channel, such that the channel filter passes i) said OFDM data signal; ii) an in-channel reference signal of the predetermined reference signals, received on an OFDM subcarrier within the tuned channel; and iii) an out-of-channel reference signal of the predetermined reference signals, received on an out-of-channel OFDM subcarrier located outside the tuned channel, wherein the radio receiver further comprises channel estimation logic configured to use both i) the in-channel reference signal, and ii) the out-of-channel reference signal, to calculate a channel estimate for an OFDM subcarrier within the tuned channel; and wherein the radio receiver is configured to, or configurable to, offset the channel filter from a center of the tuned channel by an offset amount.

2. The radio receiver of claim 1, wherein the radio receiver is configured to tune an LTE Cat-M1 channel, and wherein the channel estimation logic is configured to calculate the channel estimate using i) in-channel LTE cell-specific reference signal (CRS), and ii) an out-of-channel LTE CRS.

3. The radio receiver of claim 1, wherein the channel filter is wider than the channel bandwidth of the tuned channel by at least a width of one OFDM subcarrier of the plurality of OFDM subcarriers.

4. The radio receiver of claim 1, configured to pass the mixed signal through the channel filter such that the channel filter passes a plurality of out-of-channel reference signals of the predetermined reference signals, received on a plurality of out-of-channel OFDM subcarriers located outside the tuned channel, wherein a first set of one or more of the out-of-channel OFDM subcarriers is above the tuned channel in frequency, and a second set of one or more of the out-of-channel OFDM subcarriers is below the tuned channel in frequency.

5. The radio receiver of claim 1, wherein the channel estimation logic is configured to use a plurality of out-of-channel reference signals, received on one or more out-of-channel OFDM subcarriers located outside the tuned channel, to calculate said channel estimate.

6. The radio receiver of claim 1, wherein the channel estimation logic is configured, when calculating a channel estimate for an OFDM subcarrier within the tuned channel, to apply a set of filter weights to a plurality of unfiltered reference signals contained in a filter window.

7. The radio receiver of claim 6, configured to use the channel estimation logic to calculate respective channel estimates for each of a plurality of OFDM subcarriers within the tuned channel, and to use filter windows having a common frequency extent when calculating each of the channel estimates.

8. The radio receiver of claim 6, wherein the channel filter is sized to pass a number of out-of-channel OFDM subcarriers at least equal to the number of subcarriers spanned by the filter window when the filter window is positioned at an edge of the tuned channel.

9. The radio receiver of claim 1, wherein the offset amount is such that the channel filter passes only spectrum occupied by OFDM subcarriers transmitted by the radio transmission system, and passes no spectrum outside these OFDM subcarriers.

10. The radio receiver of claim 1, configured to offset the channel filter from the center of the tuned channel when tuning a first LTE-M channel that is located adjacent an edge of the LTE channel containing the first LTE-M channel, and to center the channel filter in the tuned channel when tuning a second LTE-M channel that is not located adjacent an edge of the LTE channel containing the second LTE-M channel.

11. A radio communication method for receiving an OFDM data signal from a radio transmission system that transmits OFDM data signals over respective channels of a plurality of predetermined radio channels, each channel having a respective fixed channel bandwidth and comprising a respective plurality of OFDM subcarriers, and that transmits predetermined reference signals at predetermined times on a reference-signal set of the OFDM subcarriers, the method comprising:

a radio receiver tuning a channel of the plurality of the radio channels by:
generating a periodic signal;
receiving radio signals from the radio transmission system and mixing the radio signals with the periodic signal to generate a mixed signal; and
passing the mixed signal through a channel filter; and
the radio receiver receiving, from the radio transmission system, an OFDM data signal modulated on a set of OFDM subcarriers within the tuned channel,
the method further comprising:
the channel filter having a passband that is wider than the channel bandwidth of the tuned channel, such that the channel filter passes i) said OFDM data signal; ii) an in-channel reference signal of the predetermined reference signals, received on an OFDM subcarrier within the tuned channel; and iii) an out-of-channel reference signal of the predetermined reference signals, received on an out-of-channel OFDM subcarrier located outside the tuned channel;
the radio receiver offsetting the channel filter from the center of the tuned channel by an offset amount; and
the radio receiver using both i) the in-channel reference signal, and ii) the out-of-channel reference signal, to calculate a channel estimate for an OFDM subcarrier within the tuned channel.

* * * * *